G. H. WILSON.
GEAR WHEEL.
APPLICATION FILED OCT. 4, 1913.
1,165,560.
Patented Dec. 28, 1915.
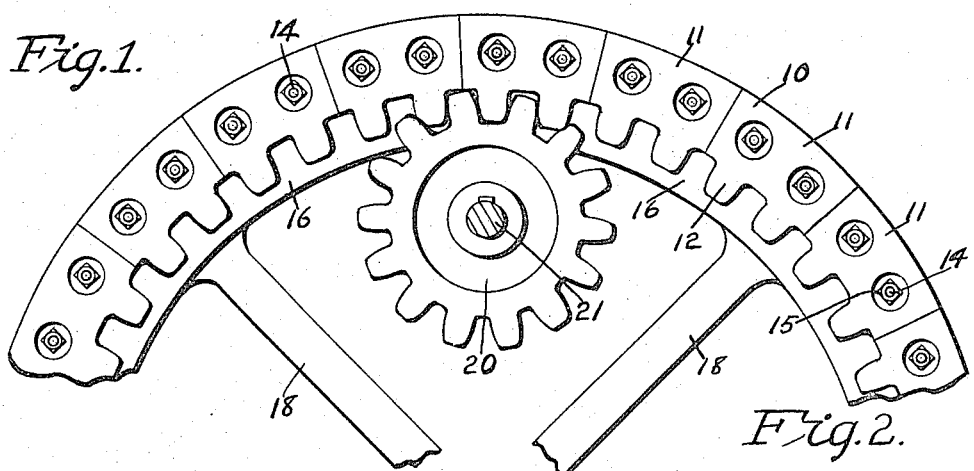
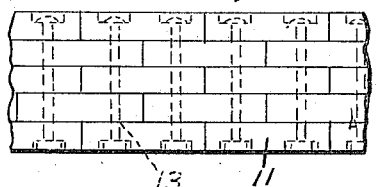
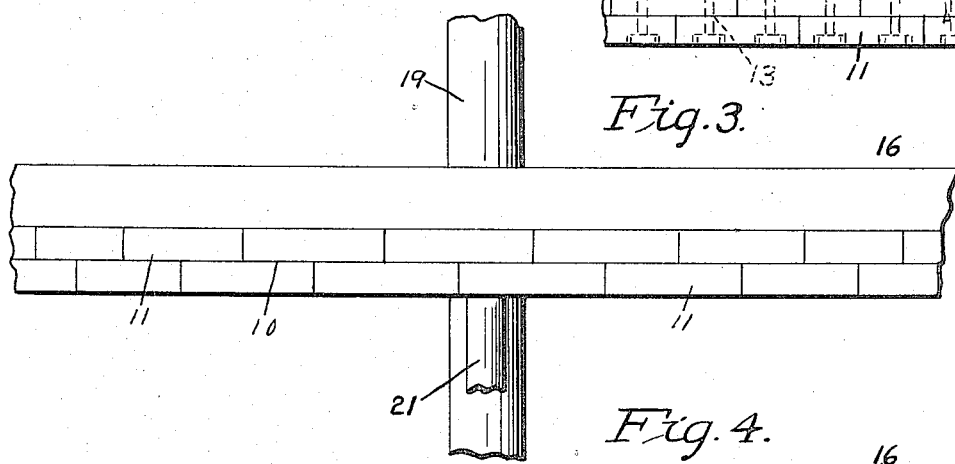
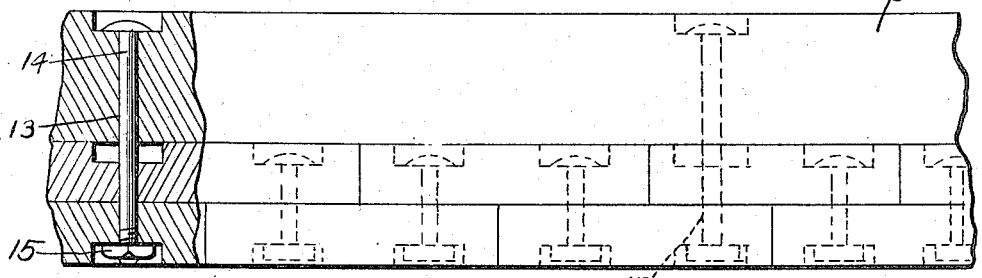
Witnesses
L. A. Paley
Robert W Muir
Inventor
George H. Wilson
By F. A. Whiteley
Atty.

UNITED STATES PATENT OFFICE.

GEORGE H. WILSON, OF MINNEAPOLIS, MINNESOTA.

GEAR-WHEEL.

1,165,560.  Specification of Letters Patent.  Patented Dec. 28, 1915.

Application filed October 4, 1913. Serial No. 793,411.

*To all whom it may concern:*

Be it known that I, GEORGE H. WILSON, a citizen of the United States, residing at Minneapolis, in the county of Hennepin and State of Minnesota, have invented certain new and useful Improvements in Gear-Wheels, of which the following is a specification.

My invention relates to an improvement in gear wheels, and has for its object to provide a wheel which may be built up by the use of a number of independent sections.

A further object is to provide a wheel built up of sections so placed one upon the other that each section will be in effect a reinforcement of the other.

A further object is to provide a gear wheel in which replacements necessary because of accident or excessive wear can be made without the necessity of an entirely new wheel.

The full objects and advantages of my invention will appear in connection with the detailed description thereof and are particularly pointed out in the claim.

In the drawings, illustrating the application of my invention in one form,—Figure 1 is a fragmentary side elevation of my invention. Fig. 2 is a plan view showing a plurality of sections fastened together to form a gear wheel. Fig. 3 is a top plan view of the wheel shown in Fig. 1. Fig. 4 is a partly sectional view showing a reinforcing side member bolted to the gear.

In the form of my invention herein described, a gear wheel 10 is built up of sections 11. Sections 11 are so constructed in relation to each other that by building both transversely and circumferentially a gear wheel 10 is formed. Each of the sections carries several of the gear teeth 12 and is so placed in relation to the other sections that its ends are situated at a point midway between the ends and the laterally adjacent sections. In other words, the ends break joints in such a way that each section is practically a reinforcement holding its adjacent sections rigidly. Bolt holes 13 are provided adjacent the ends of each section. These bolt-holes coincide with the apertures in the other sections to form a hole directly through the sections into which a bolt 14 is placed, the bolt 14 being provided with a nut 15 by means of which the sections are drawn firmly together. Nut 15 is preferably countersunk below the level of the rim of the gear wheel. A supporting wheel 16 may be bolted to the gear wheel 10 when it is desired to mount the same upon the hub. Wheel 16 may be fastened to gear wheel 10 by means of bolts 14. Spokes 18 are provided for joining wheel 16 to a hub, not shown, on shaft 19. A pinion 20 mounted on shaft 21 is shown operatively connected to gear wheel 10. It readily can be seen that gear wheel 10 can be bolted directly to the spokes of a traction wheel or fastened to the rim in a manner similar to that in which it is shown fastened to the shaft 19, or it may be fastened directly to the spokes without the use of a supporting wheel.

In the construction of my device the sections 11 are rigidly bolted together to form a gear wheel. This may be fastened to the hub of a traction wheel, to the spokes of the wheel, or to the rim, as desired. In any of these forms the gear wheel of my invention is of peculiar value because it permits the replacement of a broken or worn section. In the past, if one tooth of a gear wheel was broken it became necessary to procure a new wheel. By the use of my device it will only be necessary to insert a new section. This replacement can be very readily made without removing the gear from its mounting. In this way not only the price of a new gear can be saved but the time usually expended in removing the tractor wheel and putting on the new gear will be saved. The wheel itself can be very inexpensively made, and readily lends itself to repair by the use of extra sections. It would be of especial value in the construction of farm tractors where the cost of repairs and the length of time to make the repairs form very important factors in considering the practicability of their use.

I claim:

A gear wheel comprising a flat-sided rim, an internal gear formed on the side of said rim comprising a plurality of short segments having a plain outer edge coinciding with the outer edge of the rim of the wheel, and a series of gear teeth extending inwardly to a point short of the inner edge of the rim of the wheel, the gear teeth of all of such segments forming a continuous internal gear backed on one side by said wheel rim.

In testimony whereof I affix my signature in presence of two witnesses.

GEORGE H. WILSON.

Witnesses:
H. A. BOWMAN,
ROBERT W. MUIR.

Copies of this patent may be obtained for five cents each, by addressing the "Commissioner of Patents, Washington, D. C."